United States Patent [19]

Lang et al.

[11] 4,175,934
[45] Nov. 27, 1979

[54] CLEAR AIR DEVICE

[75] Inventors: Arnold Lang, Marburg-Wehrda; Hans-Peter Hortig, Hattersheim, both of Fed. Rep. of Germany

[73] Assignee: Hoechst Aktiengesellschaft, Frankfurt am Main, Fed. Rep. of Germany

[21] Appl. No.: 862,130

[22] Filed: Dec. 19, 1977

Related U.S. Application Data

[63] Continuation of Ser. No. 655,412, Feb. 5, 1976, abandoned.

[30] Foreign Application Priority Data

Feb. 7, 1975 [DE] Fed. Rep. of Germany ....... 2505137

[51] Int. Cl.² ............................................. B01D 51/00
[52] U.S. Cl. .................................. 55/267; 55/385 A; 55/417; 55/419; 55/467; 55/482; 98/33 R
[58] Field of Search ............. 55/261, 266, 267, 385 A, 55/417, 419, 467, 482; 98/33 R; 165/16

[56] References Cited

U.S. PATENT DOCUMENTS

| | | | |
|---|---|---|---|
| 1,916,907 | 7/1933 | Sargent | 55/267 X |
| 2,076,382 | 4/1937 | Minton | 261/DIG. 34 X |
| 2,110,024 | 3/1938 | Miller | 55/267 X |
| 2,338,382 | 1/1944 | Marlow | 165/16 X |
| 2,628,083 | 2/1953 | Rense | 55/467 X |
| 2,712,927 | 7/1955 | Blum | 98/33 R X |
| 2,892,324 | 6/1959 | Quick | 165/16 X |
| 2,983,213 | 5/1961 | Bohanon | 55/261 X |
| 3,838,556 | 10/1974 | Finger | 55/385 A |
| 3,883,637 | 5/1975 | Benedict | 55/267 X |
| 3,936,284 | 2/1976 | Mason | 55/385 A X |

*Primary Examiner*—Frank W. Lutter
*Assistant Examiner*—Kathleen J. Prunner
*Attorney, Agent, or Firm*—Curtis, Morris & Safford

[57] ABSTRACT

A clear air device to maintain the cleanliness of air in "clear rooms" and to ventilate said rooms has a casing with an air inlet grid and an air outlet grid, a preliminary filter, a ventilator and a high efficiency particulate air filter unit (HEPA). The preliminary filter, the ventilator and the high efficiency filter are arranged within the casing in such an order that the air drawn in through the inlet grid first passes said preliminary filter, then the ventilator and thereafter the HEPA. The wall of the casing is provided with one opening between the air inlet grid and the preliminary filter and one opening between the HEPA and the air outlet grid.

3 Claims, 1 Drawing Figure

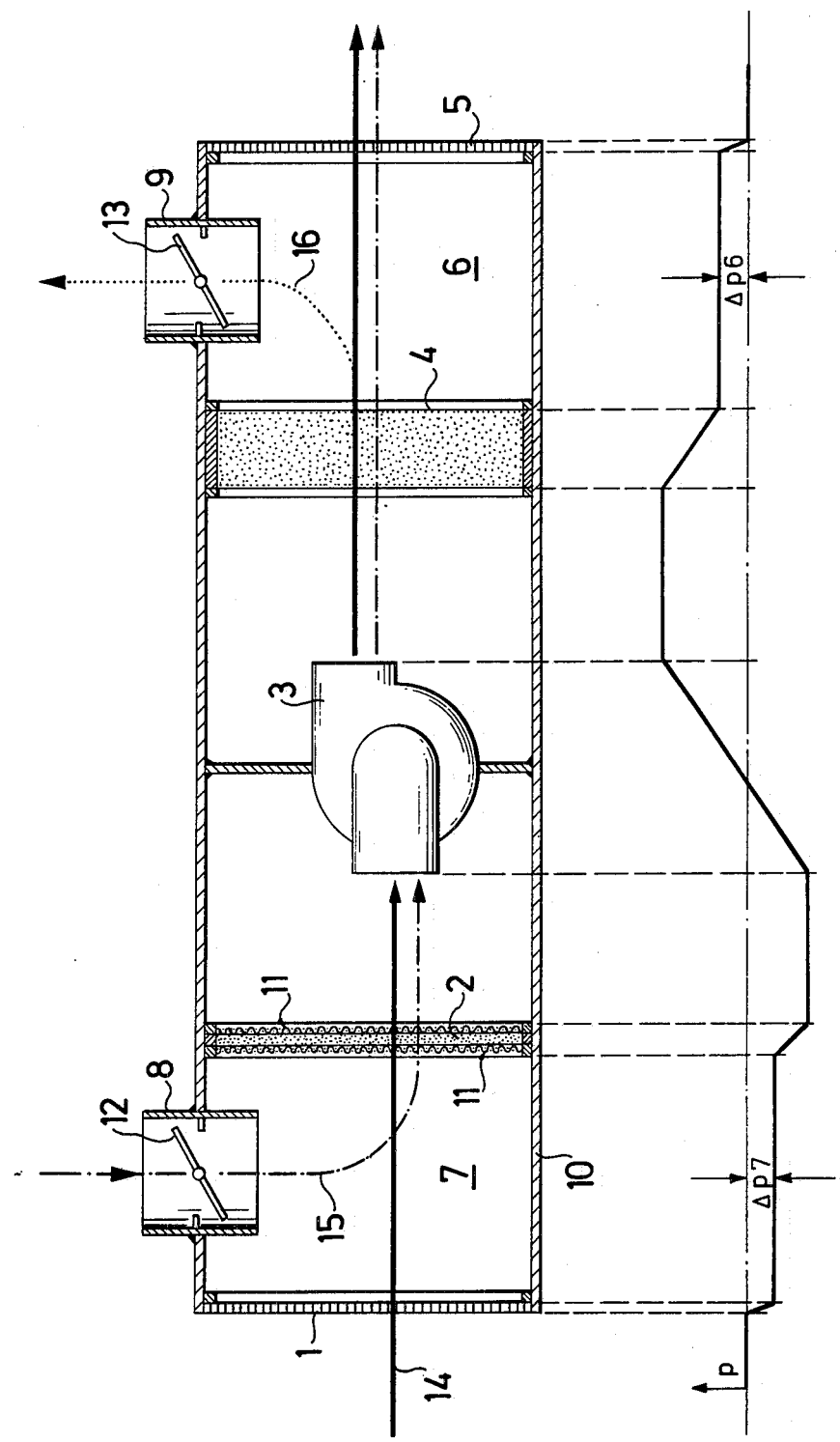

CLEAR AIR DEVICE

This is a continuation of application Ser. No. 655,412, filed Feb. 5, 1976 now abandoned.

This invention relates to a clear air device to be used to maintain the cleanliness of the air of a "clean room" (as defined in US Federal Standard 209a) and to ventilate said room.

It is known to draw off the air of a room through an exhaust air grid and preliminary filter, to purify the air in a high efficiency particulate air filter unit (HEPA) and to recycle it into the room (air circulation process). It is also known to add fresh air to the air drawn off the room, i.e. to the portion to be recycled, before it passes the HEPA, while allowing an equivalent portion of the contaminated air to pass into the atmosphere as off-air or to conduct the drawn off air through central purification.

Both processes require considerable constructional arrangements in the room. Ceiling, walls or floor must be provided with appropriate grids for the exhaust air and supplied air. The circulated and the fresh air are purified in central systems where the off-air is also purified, which may cause cross-contaminations when a plurality of rooms is connected to the system. Transportable small devices have been developed for the air circulation process (cf. GIT Fachzeitschrift fur das Laboratorium 14, 1970, page 1122) to maintain cleanliness in small areas.

It is the object of the present invention to find a clear air device which can be installed in simple manner without additional structural measures and with which the circulated air, the fresh air and the off-air can be purified by means of a HEPA.

The clear air device according to the invention, which is used to maintain the cleanliness of the air of a "clean room" and to ventilate said room, comprises a casing with an air inlet grid and an air outlet grid, a preliminary filter, a ventilator and a high efficiency particulated air filter unit. The preliminary filter, the ventilator and the HEPA filter are arranged in such an order that the air drawn in through the inlet grid first passes said preliminary filter, then the ventilator and thereafter the HEPA. The wall of the casing is provided with one aperture between the air inlet grid and the preliminary filter and one aperture between the HEPA and the air outlet grid.

The clear air device according to the invention will now be described in further detail and by way of example only with reference to the accompanying drawing which also illustrates the pressure conditions in the device created by the pressure spaces formed by the grids, the filters and the ventilator.

The casing (10) of the clear air device encloses an air inlet grid (1) at the exhaust air side and an air outlet grid (5) at the clear air side. Between the grids (1 and 5) are arranged in the casing a preliminary filter (2) with supporting and holding grid (11), a ventilator (3) and a HEPA filter (4). The space between the inlet grid (1) and the preliminary filter (2) defines a suction space or first chamber (7) provided with an opening (8) with throttle valve (12), which opening communicates with the outer atmosphere (not shown). The space between the HEPA (4) and the air outlet grid (5) defines a pressure space or second chamber (6) which is likewise provided with an opening (9) with throttle valve (13) in communication with the outer atmosphere. The full line (14) symbolizes the circulated air, the dash-dotted line (15) illustrates the fresh air and the dotted line (16) represents the off-air.

At the bottom of the drawing is a pressure diagram which illustrates the pressure conditions in the device created by the pressure spaces formed by the grids, the filters and the ventilator. The horizontal dash-dotted line represents the atmospheric pressure outside of the clear air device. The solid line represents the relative pressure conditions within the device and the vertical dashed lines correlate the different sections of the clear air device and the corresponding pressure conditions therein.

With a determined HEPA (4), which should be dimensioned in the first place in accordance with the amount of air to be treated per unit of time, the air inlet grid (1), the preliminary filter (2) and the air outlet grid (5) should be harmonized to one another in such a manner that the absolute value $\Delta p7$ in the suction space (7) is equal to the absolute value $\Delta p6$ in the pressure space (6). The ratio of fresh air to circulated air and of off-air to circulated air plus fresh air is adjusted by the throttle valves (12 and 13). If desired or required, the two grids (1 and 5) or only one of them could be constructed as heat exchanger.

The circulated air is drawn through the inlet grid (1) and the fresh air is drawn through the aperture or opening (8) into the suction space or chamber (7). The circulated and fresh air is then drawn through the preliminary filter (2) and into the ventilator (3) and next blown through and cleansed in the HEPA filter (4) into the positive pressure space or chamber (6). Finally, a first portion of the cleansed circulated and fresh air is blown through the air outlet grid (5) back into the room and a second portion of the cleansed circulated and fresh air, as off air, is blown through the aperture or opening (9) into the outer atmosphere.

As the pressure diagram indicates, as air is introduced into the air inlet grid (1) the air pressure is reduced to a pressure below atmospheric pressure before the air exits the inlet grid (1) and passes into the suction space or chamber (7). As air enters and is blown out of the ventilator (3), the air pressure is increased to a pressure above atmospheric pressure. The air outlet grid (5) maintains the pressure of the air blown into the pressure space or chamber (6) at an above atmospheric pressure. As the first portion of cleansed circulated and fresh air is introduced into the air outlet grid (5), the air pressure is reduced to atmospheric pressure before the air exits the air outlet grid (5) and passes back into the room.

The device of the invention has a simple construction and offers the advantage that one ventilator and one HEPA are sufficient for the transport and the purification of three air currents. It can be fitted without special constructional provisions into existing rooms. In principle, the device of the invention can be used for all rooms requiring clear air techniques, especially for venting "clean rooms" in which infectious substances are handled.

The following example illustrates the invention.

EXAMPLE

A room having a floor area of 20 square meters and a height of 2.5 meters, which was vented in conventional manner by total air exchange with 5 air changes per hour, with two persons working therein each having an emission of $5 \cdot 10^6$ particles per minute contained a calculated particle concentration of $$\frac{6 \cdot 10^8}{.250} \frac{\text{particles/hr}}{\text{m}^3/\text{hr}} = 2.4 \cdot 10^6 \text{ particles per cubic meter}$$

or 2,400 particles per liter of air.

With a Royco particle counter from 2,000 to 4,000 particles were counted per liter of air.

Without increasing the portion of supply air the concentration was reduced to less than 500 particles per liter of air by the use of the device of the invention.

For the device of the invention a HEPA having a surface area of 1.2 square meters was chosen which permitted air velocities of approximately 0.3 to 0.6 meter per second. With an air speed of 0.5 meter/second 2,160 m³ of air were filtered per hour. With consideration of the aforesaid proportions of supply air and off-air of 250 m³ per hour the clear air device transferred 1910 m³ of clean air into the room, which corresponded to a particle concentration of $$\frac{6 \cdot 10^8}{1910} \frac{\text{particles/hr}}{\text{m}^3/\text{hr}} = 314 \text{ particles per liter of air.}$$

With the Royco particle counter from 70 to 500 particles were counted per liter.

What is claimed is:

1. A device for drawing and cleansing circulated air from a room and fresh air from the outer atmosphere, the circulated and fresh air being at an atmospheric pressure, and passing a first portion of the cleansed circulated and fresh air back into the room and a second portion of the cleansed circulated and fresh air, as off air, into the atmosphere comprising a hollow casing having within said casing first and second openings which communicate with the outer atmosphere, air inlet grid means, air outlet grid means, a preliminary filter, a high efficiency particulate air filter unit, and means for drawing air into and blowing air out of said casing, said inlet grid means and said preliminary filter being positioned in said casing to define a first chamber therebetween, said first opening providing communication between said first chamber and the outer atmosphere, said means for drawing and blowing air being positioned in said casing between said preliminary filter and said high efficiency particulate air filter unit, said high efficiency particulate air filter unit and said outlet grid means being positioned within said casing to define a second chamber therebetween, said second opening providing communication between the second chamber and the atmosphere, the means for drawing and blowing air first drawing circulated air through the inlet grid means and fresh air through the first opening, next drawing the circulated and fresh air through the preliminary filter and into the means for drawing and blowing air, next blowing the circulated and fresh air out of the means for drawing and blowing air and through the high efficiency particulate air filter unit and finally blowing a first portion through the air outlet grid means and a second portion through the second opening into the outer atmosphere, said means for drawing and blowing air comprising means for increasing the pressure of the circulated and fresh air entering and being blown out of the means for drawing and blowing air, to a pressure above the atmospheric pressure, said air inlet grid means comprising means for reducing the pressure of circulated air introduced at the air inlet grid means to a pressure below atmospheric pressure before the circulating air exits the inlet grid means and passes into the first chamber and said air outlet grid means comprising means for maintaining the pressure of the cleansed circulated and fresh air blown into said second chamber at a pressure above the atmospheric pressure and reducing the pressure of the first portion of cleansed circulated and fresh air introduced at the air outlet grid means to atmospheric pressure before the first portion exits the outlet grid means and passes back into the room.

2. The device of claim 1, wherein at least one of the grid means is constructed as a heat exchanger.

3. The device of claim 1, wherein the openings in the casing have throttle valves.

* * * * *